United States Patent [19]

Hooper

[11] 3,866,892
[45] Feb. 18, 1975

[54] DUAL TORCH CUTTING APPARATUS

[75] Inventor: Harry Hooper, Brookfield, Wis.

[73] Assignee: C-R-O Engineering Co., Inc., Brookfield, Wis.

[22] Filed: June 11, 1973

[21] Appl. No.: 368,498

[52] U.S. Cl. .............................. 266/23 K, 266/23 B
[51] Int. Cl. .............................................. B23k 7/02
[58] Field of Search .... 266/23 B, 23 D, 23 E, 23 K, 266/23 C, 23 M; 90/13.5, 13 G; 408/46; 318/575

[56] References Cited
UNITED STATES PATENTS

| | | | |
|---|---|---|---|
| 2,622,871 | 12/1952 | Martin | 266/23 B |
| 2,943,251 | 6/1960 | Hull | 90/13 C |
| 3,114,205 | 12/1963 | Bechtle | 266/23 E |
| 3,127,661 | 4/1964 | McConnell | 408/46 X |

FOREIGN PATENTS OR APPLICATIONS 917,376  2/1963  Great Britain .................... 266/23 B

OTHER PUBLICATIONS

The iron Age, "Flame Cutters Trace Fast Patterns," 216158, page 110.

Primary Examiner—Roy Lake
Assistant Examiner—Craig R. Feinberg
Attorney, Agent, or Firm—Andrus, Sceales, Starke & Sawall

[57] ABSTRACT

A flame cutting apparatus includes a carriage support longitudinally movable over a work blank. A front bridge unit and a rear bridge unit defining a pair of separate transverse torch supports. The front bridge unit is a conventional multiple torch system to permit cutting of two or more members simultaneously from the blank. The second bridge unit is especially constructed to receive a cutting torch and to permit complete transverse of the work blank. Both bridge units have a common longitudinal servo drive means for the corresponding positioning longitudinally over the blank. A pair of separate and alternately operable transverse servo drives are provided, one each for each of the two bridge units. A selector switch connects one or the other but not both of the transverse servo drives into the main control for introduction of only one unit for simultaneously and integrated movement with the common longitudinal servo drive means. The rear bridge unit consists of a supporting bridge and carriage structure which is releasably interconnected to the main carriage for selective incorporation as a part of a basic multiple torch machine line.

8 Claims, 4 Drawing Figures

PATENTED FEB 18 1975
3,866,892
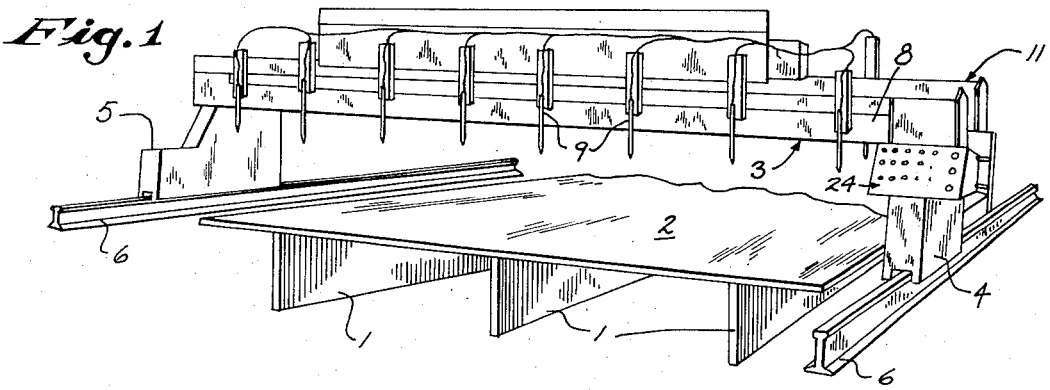
Fig.1
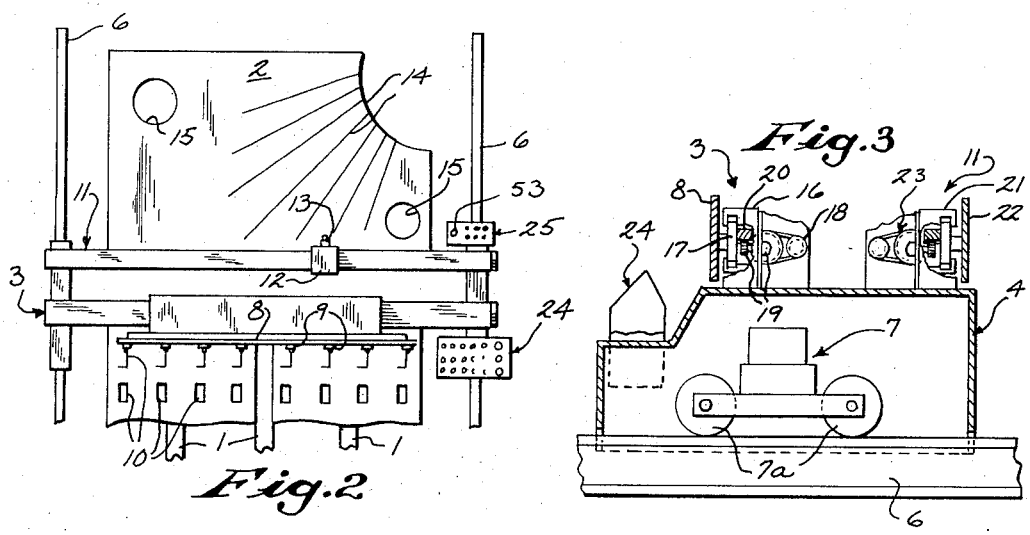
Fig.2
Fig.3
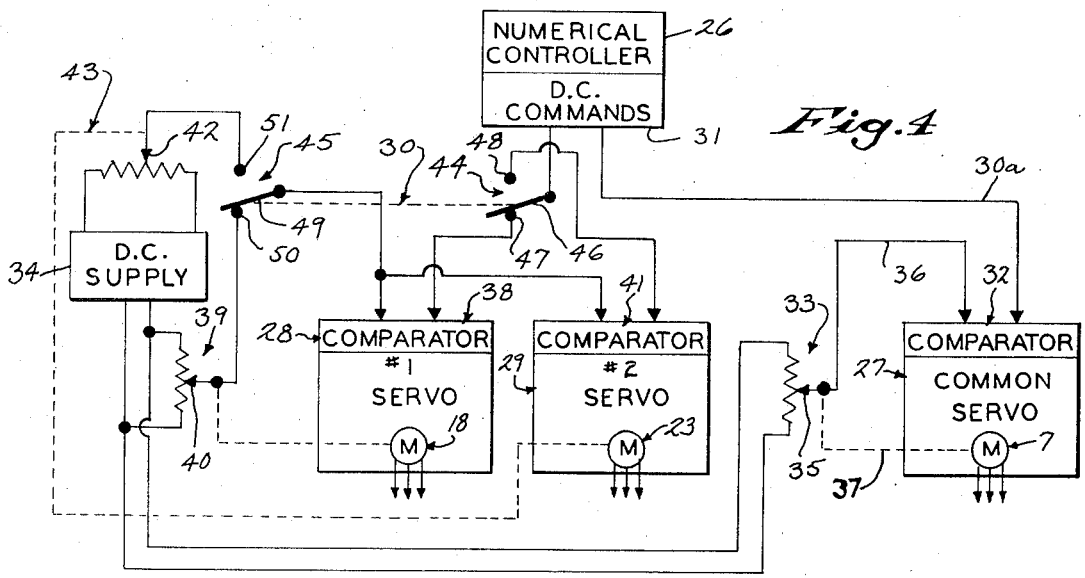
Fig.4

DUAL TORCH CUTTING APPARATUS

BACKGROUND OF THE INVENTION

This invention relates to a flame cutting machine control, particularly for cutting of preselected configurations from a flat metal plate.

Flame cutting machines are widely employed in industry to cut predetermined plate-like elements from a relatively large metal blank and to form predetermined cuts in a relatively metal plate. Generally, such apparatus employs a plurality of torches interconnected through a common carriage for transverse movement over a work plate or blank. The carriage, in turn, is mounted for longitudinal movement over the blank. A servo system provides for interrelated control along laterally and longitudinally of the blank to provide for the simultaneous severing of various similar small parts from the metal blank. For example, a particularly satisfactory torch flame cutting means is disclosed in U.S. Pat. No. 3,434,212, which includes a means for generating circular functions and the like to permit cutting in accordance with various geometric shapes. U.S. Pat. No. 3,465,219 discloses a similar apparatus with a different type of a servo control system for providing preselected movement of the tool to define selected straight line geometric configurations.

Automatic multiple parts, flame cutting machines have been of either two basic designs. In a rigid bar type, such as disclosed in the above patents, a single transverse carriage supports a number of the cutting torches with the torches spaced on the transverse bar. The contour is determined by a suitable servo drive having a numerical controller, a photo-electric tracer or input means to establish a controlled interrelated drive along the longitudinal and transverse axis of the apparatus. Generally, the transverse movement of the flame cutting torches is limited by the available support length for the common carriage as the carriage is normally limited to movement between the outer sides of the apparatus in order to prevent projection into adjacent aisles. Thus, a machine 20 feet wide, with a common carriage of a 14 foot width would have a limited transverse travel of approximately 6 feet. Any further movement would extend the carriage beyond the side of the machine frame thus into the adjacent work area. Such movement if considered undesirable particularly from the standpoint of safety to the working personnel.

Alternatively, band support type machines have been provided in which a master carriage and a number of slave carriages are mounted on the transverse beam of the cutting machine. The master carriage is carried by an endless band which is looped at the opposite ends over supporting members at the opposite ends of the transverse beams. The master carriage includes a servo drive to control the carriage movement and consequently the interconnected bands. The slave carriages are clamped or otherwise secured to the band to duplicate the transverse motion of the master carriage. In the band system, all but one of the slave units may be removed to form a single torch cutter with the total transverse width of the machine available for cutting of a single part. Where a cut is accomplished by removal of only torches and without removal of the carriages the cut is limited by the width and the location of the slave carriages. For example, the transfer width may typically be 20 feet with 8 slave carriages, each of which is 9 inches wide. The total possible transverse motion is 14 feet with the carriages intact.

Although such systems are relatively widely employed in the industry in order to adapt the machine to multiple torch cutting, the requirement of removing and adding torches and interrelated equipment in order to adapt the machine to particularly relatively large cuts can result in a relatively time consuming and therefore relatively expensive work processing. Further, even with the units modifield the complete transverse width of the machine cannot be readily provided.

SUMMARY OF THE INVENTION

The present invention is particularly directed to a single torch cutting apparatus for providing multiple and single cuts. Generally, in accordance with the present invention, the torch cutting apparatus includes a carriage support mounted for longitudinal movement over a work blank in combination with a front and rear transverse support defining a pair of separate transverse torch supporting systems. The one support is particularly constructed as a main unit for multiple torch support to permit cutting of two or more work pieces or members simultaneously from the blank. The second transverse system is especially constructed to receive one or more heads for operation over the complete work area or blank. In accordance with a particularly important feature of this invention, both transverse supports are carried by a common carriage with a common single longitudinal servo drive means for the positioning of both supports longitudinally over the blank. A pair of separate transverse servo drives are provided, one each for each of the two transverse support systems with a selector switch means for alternative interconnecting of the corresponding transverse servo system into the main control for simultaneously and integrated drive with the common longitudinal servo drive means. The servo system may have any suitable input means such as a numerically controlled director, a photo-electric tracer, or the like. The present invention thus provides a highly versatile and practical apparatus which will eliminate many of the disadvantages of the devices heretofore provided.

In accordance with any particularly novel feature in construction of the present invention, the second transverse system consists of a supporting bridge and carriage structure which is releasably interconnected to the main carriage separate from the main transverse beam for the multiple torch system. Thus, the additional transverse drive system can be selectively supplied as a part of a basic multiple torch machine line. It is merely necessary to mount that second bridge with its supporting system and servo drive on the apparatus and provide the selector switch for interconnecting of the servo signals into the two alternate drives. Although for any given cutting operation, the actual cutting time remains as in the prior art, the present invention minimizes the setting of the apparatus to produce a single wide cut and the difficulties heretofore encountered with the conventional machine in accommodating various work requirements.

The present invention thus provides a relatively simple and inexpensive versatile cutting apparatus permitting the cutting of multiple small components as well as a single large component from a similar blank.

BRIEF DESCRIPTION OF DRAWING

The drawing furnished herewith illustrates the best mode presently contemplated by the inventor for carrying out the present invention and clearly discloses the above advantages and features as well as others which will be readily understood from the detailed description thereof.

In the drawing:

FIG. 1 is a pictorial elevational view of a torch cutting machine constructed in accordance with the present invention;

FIG. 2 is a top view of the apparatus shown in FIG. 1;

FIG. 3 is a side elevational view of the machine as shown in FIG. 1; and

FIG. 4 is a schematic circuit illustration of the servo control system controlling the torch cutting machine of FIGS. 1-3.

DESCRIPTION OF ILLUSTRATED EMBODIMENT

Referring to the drawing and particularly to FIGS. 1-3 a multiple torch flame cutting machine is illustrated including a conventional work support 1 which is adapted to support an elongated metal plate 2 in a horizontal position to permit the cutting of the plate 2 with a vertically projecting cutting flame. A supporting cross bridge or beam unit 3 spans the work support 1 and is movably mounted at the opposite ends by suitable main carriage units 4 and 5 for longitudinal movement over the work piece 2. In the illustrated embodiment of the invention, a pair of support rails 6 extend longitudinally of the work support 1 to the opposite side thereof. The main carriage units 4 and 5 are similarly mounted on the rails for corresponding longitudinal movement and one of the carriage units includes a positive drive means. For example, as shown in FIG. 3, an electric motor-reducer unit 7 may be mounted as a part of the main carriage unit 4 and coupled through to drive wheel members 7a for moving of the assembly longitudinally of the work piece 2 along the rails 6.

The beam unit 3 includes a multiple torch support plate 8 for receiving a plurality of cutting torches 9 for simultaneous drive and positioning thereof. The plate 8 and torches 9 may be of any known or suitable construction to provide for the simultaneous multiple cutting of plate 2; for example, to form corresponding rectangular parts 10 from the work member as shown in FIG. 2.

In accordance with the present invention, a second completely separate transverse tool support bridge unit 11 is mounted in longitudinally spaced relation to the first unit 3 and supported in a similar manner at the opposite end by the same carriages 4 and 5. The second unit 11 is specially constructed to receive a single tool mount unit 12 which movably supports a torch 13 adapted to traverse the complete width of the machine.

In accordance with the present invention, the system provides a means for the special cutting of one or more parts of any desired size, or marking the work member 2 without changes in the arrangement or setting of the front multiple torch assembly 8-9 by proper timed movement of the main carriages 4 and 5 and the interrelated transverse mount unit 12. For example, contour beveling and marking as at 14 in FIG. 2, or special plate marking as at 15 may be provided by proper movement of torch unit 13. Individual transverse servo drive means are provided for front torch plate 8 and rear torch mount 12 and are alternatively interconnected with a common longitudinal servo drive means to thereby provide a single machine alternately providing for either the multiple torch operation or the single torch operation.

More particularly, the transverse beam unit 3 includes a supporting cross beam 16 with the main multiple torch plate 8 generally rigidly affixed to a transverse carriage or saddle 17 for transverse movement on the beam. Any suitable reversible drive system may be employed to position the carriage, for example, such as shown in U.S. Pat. No. 3,434,212. Generally, a main transverse drive motor 18 is secured within the cross beam 16. The output of the motor is suitably coupled through a suitable gear and pinion unit 19 to position the carriage 17 and therefore torches 9. A main transverse rack 20 on the carriage 17 is shown in FIG. 3 meshing with the pinion unit 19 for moving of the carriage and plate at an appropriate transverse speed. The plurality of individual torches 9 are secured to the front of the plate 8 and move simultaneously across the work member 2 to provide simultaneous corresponding cuts 10.

In accordance with the present invention, the unit 11 is releasably mounted and includes a separate support beam 21 which in interconnected to the trailing or backside of the longitudinal moving carriages 4 and 5. The beam 21 is releasably attached to the carriages 4 and 5 for selective attachment as a part of a torch cutting machine. A single torch carriage or saddle 22 is movably mounted on the beam 21 in any well-known manner and can travel the complete width of the transverse beam. Thus, a separate drive motor gear coupling 23, similar to that for the front plate drive, may be provided.

A single control panel or separate panels 24 and 25, as shown, may be provided to control bridge units 3 and 11 for setting of the transverse and longitudinal speed of the selected unit and thereby determine the geometric shape as a result of the simultaneous longitudinal and transverse drive.

The apparatus may be controlled from a numerical controller 26, as diagrammatically shown in FIG. 4, a phototracer system or any other suitable drive. In any event, the drive control system includes three independent servo systems, for example, as schematically shown in FIG. 4. Generally, a single or master longitudinal servo system 27 is provided for controlling the longitudinal positioning of the two carriages 4 and 5 and, consequently, the simultaneous and corresponding positioning of the two transverse bridge units 3 and 11. Individual transverse servo systems 28 and 29 are provided for correspondingly positioning either the torch 9 or the torch 13 transversely of the work member 2 depending upon the position of a selection means 30.

More particularly, the main servo system 27 includes a command signal input line 30a to provide a DC voltage derived from a DC supply, or other suitable reference command signal unit 31 of controller 26. The command signal line 30a is connected as one input into a comparator network 32. A feedback unit 33, such as the illustrated feedback potentiometer, is connected to a similar DC supply 34. A slider or tap 35 thereon is connected to a second input line 36 to the comparator network 32 of the servo unit 27 and defines a position sensitive input to the network 32.

The tap 35, in turn, is coupled, as shown by dotted line 37 to the drive system of the carriage such as the motor-reducer unit 7 and is positioned directly in accordance with the relative longitudinal positioning of the main carriages. The command signal may, of course, be preset manually or through the numerical controller 26 or the like. The output directly controls the motor-reducer unit 7 or the drive coupling therein to continuously control the speed of the longitudinal movement of beam units 3 and 11 across the work member 2.

In accordance with the usual servo functions, the comparator network 32 compares the two signals and detects any preselected difference therebetween to continuously drive the motor unit 7 to correspondingly position the carriages 4 and 5 on rails 6. The tap 37 is correspondingly positioned until the feedback signal is related to the command signal in a predetermined manner to thereby establish a null position.

The transverse servo systems 28 and 29 correspond in a similar manner to drive the related motors and thereby provide a corresponding command tracking of a command signal.

The main multiple torch carriage servo 28 similarly includes a comparator network 38 connected via selection means 30 to the command unit 31 and to a position feedback potentiometer 39 to control the transverse drive system 18. The potentiometer tap 40 is coupled to the main transverse carriage 17 or motor 18 and is correspondingly positioned to provide a corresponding input signal.

The single torch servo 29 similarly includes comparator 41 connected by selection means 30 to command unit 31 and to the tap 42 of a position feedback potentiometer 43 to provide a controlled energization of the transverse drive motor 23.

The selection means 30 is shown as a selector switch which alternately connects the command unit 31 to a selected only one of the two servo systems 28 and 29 and correspondingly simultaneously selects the proper feedback potentiometer 39 or 43.

The switch 30 is illustrated as a manually operable, double-pole and double-throw switch unit having a first switch section 44 selectively interconnecting the command signal source 31 to one of the servo units 28 or 29 and a second command switch section 45 connecting the corresponding feedback potentiometers 39 and 43 to the related servo unit.

More particularly, the command switch section 44 includes a common contact or pole 46 connected to the output of the command unit 31 and selectively engaging a first contact 47 connected to the first transverse servo 28 and a second contact 48 connected as the command input to the second servo 29.

The second switch section 45 of the switch 30 includes a common pole 49 connected in common as the feedback inputs to the first and the second servos 28 and 29. The common pole 49 selectively engages a first contact 50 connected to the tap of the potentiometer 39 of the first servo 28. In the alternate position, the pole 49 engages a second contact 51 connected to the tap 42 of the feedback potentiometer 43 for the second servo 29 for controlling of the single torch mount drive 23. The common poles 46 and 49 are ganged for selectively and correspondingly engaging the first and second contacts to enable only one of the transverse servos 28 or 29 at any given time.

Thus in the operation of the apparatus the machine is constructed where desired with the second transverse unit 11 attached. The control panel 25 includes a selective switch operator 53 for selectively introducing of the command signal into the desired servo system 28 or 29. If multiple torch cutting is required, the selector switch operator 53 is correspondingly positioned. With the appropriate torches 9 mounted on the torch plate 8, the machine provides simultaneous multiple severing of the work plate 2. If, for any reason, a special cut, marking or the like is desired which cannot be provided by the forward unit 3 because of the limited movement permitted by the support plate 8, the operator moves operator 53 to reverse the position of the selection switch 30, which then actuates the command circuit to connect and enable the single torch servo 29 of unit 11.

The illustrated single torch unit 11 is constructed as a releasably attached beam structure such that the apparatus can be built as a standard multiple torch unit to which the alternate or additional single torch beam unit 11 can be attached if desired without requiring any basic change in the construction of the machine. The second carriage means can, of course, support one or more heads for corresponding movement over the complete or entire work area. Further, the head may be any one of the several working elements conventionally employed in practice, such as a rotating triple torch head for contour beveling, a plate marker, a plasma torch or the like. Thus, the invention is applicable to the broad field of flame cutting including the conventional oxy-fuel flame cutting and plasma cutting.

The present invention thus provides a highly improved metal cutting machine permitting application to wide, various cutting requirements and particularly permitting the cutting of multiple-small parts or components as well as individual relatively large parts.

Various modes of carrying out the invention are contemplated as being within the scope of the following claims, particularly pointing out and distinctly claiming the subject matter which is regarded as the invention.

I claim:

1. A flame cutting apparatus for flame cutting of a workpiece supported in a work area, comprising a longitudinal carriage means mounted for longitudinal movement over a work area, a first bridge unit attached to said carriage means and extending across said work area, said first bridge unit including transverse carriage means to support a plurality of cutting torches for simultaneous transverse movement over the work area, a second bridge unit attached to said longitudinal carriage means in longitudinally spaced relation to said first bridge unit, said second bridge unit having a second transverse carriage means movably supporting a torch means for transverse movement over essentially the complete work area, and control means having a first position operably connected to said first transverse carriage means and a second position operably connected to said second transverse carriage means to transversely move one or the other carriage means and thereby provide alternate working capabilities of the apparatus.

2. The flame cutting apparatus of claim 1 wherein said second bridge unit is releasably attached to said longitudinal carriage means.

3. The flame cutting apparatus of claim 1 wherein said control means includes a longitudinal servo drive means for positioning of said longitudinal carriage means, a first transverse servo drive means for said first transverse carriage means, a second transverse servo drive means for said second transverse carriage means, a servo command unit, and switch means selectively and operatively connecting of the command unit to said longitudinal servo drive means and to only one of said transverse servo drive means.

4. The flame cutting apparatus of claim 3 wherein said servo means include similar individual feedback signal means, and said switch means selectively operatively connects the feedback signal means of the corresponding one of the transverse servo drive means.

5. The flame cutting apparatus of claim 1 wherein said first and second bridge units are mounted in parallel relation and perpendicular to the longitudinal movement.

6. The flame cutting apparatus of claim 5 wherein said control means includes a longitudinal servo drive means for positioning of said longitudinal carriage means, a first transverse servo drive means having a command input means and a position feedback means for said first transverse carriage means, a second transverse servo drive means having a command input means and a positioning feedback means for said second transverse carriage means, a servo command unit, and switch means selectively and operatively connecting of the command unit to only one of said transverse servo drive means and simultaneously connecting of the corresponding feedback means to the corresponding transverse servo drive means.

7. The flame cutting apparatus of claim 6 wherein said switch means includes first contact means alternatively connected between the position feedback signal means of the first and the second transverse servo drive means, said switch means includes second contact means alternatively connected between the command unit and one of said first and second transverse servo drive means, and means to simultaneously and correspondingly position said first and second contact means.

8. The apparatus of claim 7 wherein said contact means are double-throw switches having ganged common poles.

* * * * *